July 15, 1952     H. L. BERNARDE     2,603,704
ELECTRORESPONSIVE DEVICE
Filed Sept. 27, 1949
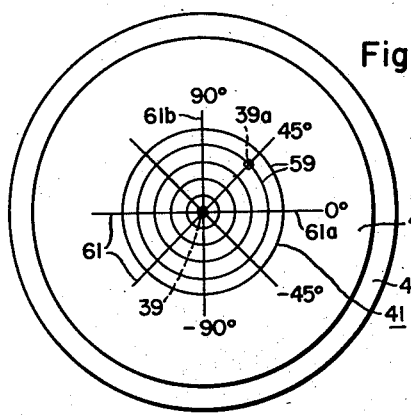
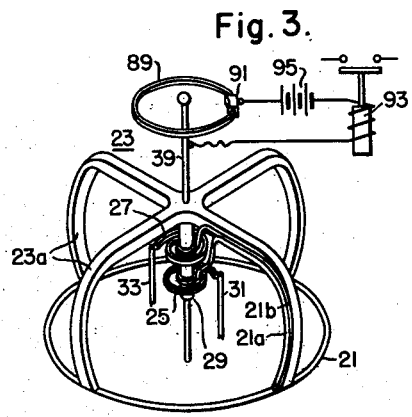
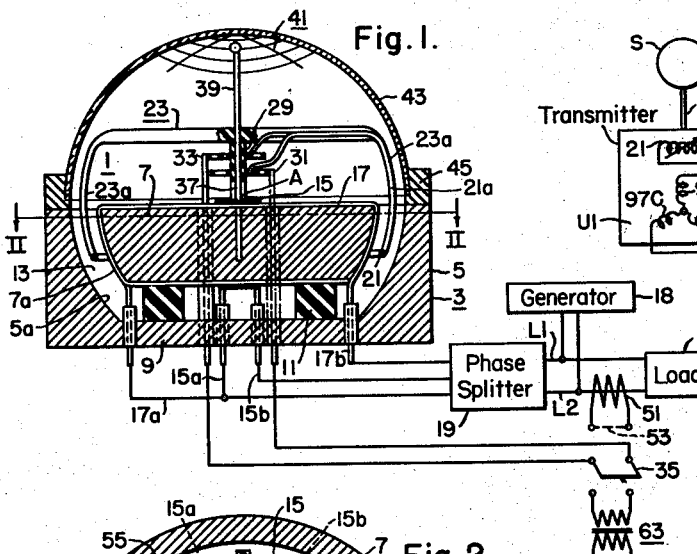
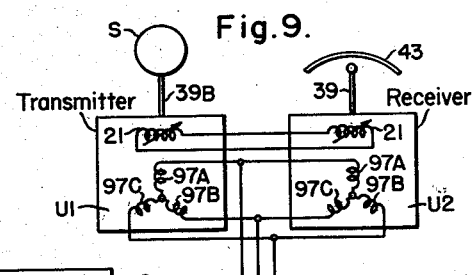
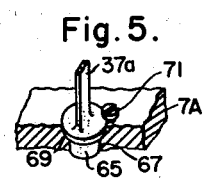
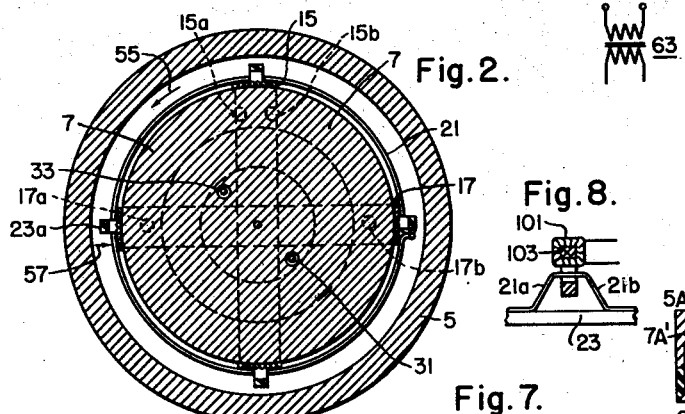
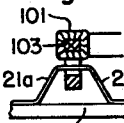
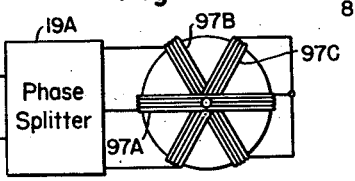
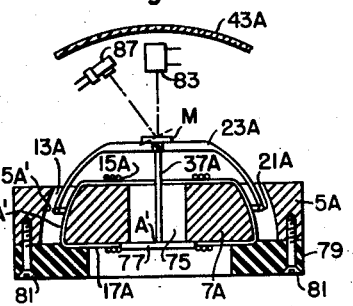
WITNESSES:
INVENTOR
Henry L. Bernarde.
BY
ATTORNEY Patented July 15, 1952

2,603,704

UNITED STATES PATENT OFFICE 2,603,704

ELECTRORESPONSIVE DEVICE

Henry L. Bernarde, Union, N. J., assignor to Westinghouse Electric Corporation, East Pittsburgh, Pa., a corporation of Pennsylvania Application September 27, 1949, Serial No. 118,105

14 Claims. (Cl. 177—351)

1

This invention relates to electroresponsive devices, and it has particular relation to electrical instruments suitable for measuring and relaying purposes, and for portraying direction and amplitude of variable quantities.

In accordance with the invention, an instrument is provided with a ring-shaped air gap and windings for establishing a polyphase field rotating about the axis of the air gap. A conductor, preferably in the form of a circular coil, is disposed in the air gap for movement about a point substantially on the axis of the air gap. Preferably, the coil is disposed for universal movement about the aforesaid point.

If the instrument is to be employed for measuring purposes, it may be provided with an indicator disposed for movement in response to movement of the coil. The indicator moves with respect to a scale member which conveniently may have a polar scale associated therewith. Depending on the energization of the coil and windings, the instrument may be responsive to voltage, current, volt-amperes, real power, reactive power and phase angle of alternating-current quantities. In addition, the instrument may be employed as a synchroscope for indicating the phase and frequency relationships existing between two alternating quantities. If provided with circuit-controlling means, the instrument may control any desired circuit in response to any of the aforesaid electrical quantities. By provision of a suitable control of the movement of the coil the instrument may be employed as a phase shifter which also has a controlled voltage output. Two instruments embodying the invention may be employed as transmitter and receiver for transmitting information over substantial distances.

It is, therefore, an object of the invention to provide an improved instrument having an air gap within which a polyphase or rotating field may be established and having a conductor pivoted in the polyphase field for universal movement with respect to the field-producing means.

It is also an object of the invention to provide an electroresponsive instrument having a magnetic structure provided with an annular air gap and windings for establishing, when energized, a rotating magnetic field in the air gap, a circular coil being mounted in the air gap for universal movement with respect to the magnetic structure.

It is also an object of the invention to provide a measuring instrument embodying the structure of the preceding paragraph, wherein movement

2 of the coil with respect to the magnetic structure operates to move an indicator with respect to a scale member having a polar scale thereon.

It is a still further object of the invention to provide a circuit-controlling device embodying the structure of the penultimate paragraph, wherein circuit-controlling mechanism is provided which is responsive to movement of the coil with respect to the associated magnetic structure.

It is an additional object of the invention to provide a transmitter and receiver assembly wherein a plurality of units are provided each comprising a coil disposed in an air gap and windings for establishing a rotating magnetic field in the air gap and means connecting the receiver to the transmitter for actuation in accordance with the phase or direction relative to a standard and the amplitude of a variable quantity.

Other objects of the invention will be apparent from the following description, taken in conjunction with the accompanying drawing, in which:

Figure 1 is a view in sectional elevation, with circuits schematically shown, of an instrument embodying the invention;

Fig. 2 is a view in section, taken along the line II—II of Fig. 1;

Fig. 3 is a view in perspective, with parts broken away, of a coil movement suitable for the instrument of Fig. 1 shown in association with circuit-controlling mechanism;

Fig. 4 is a view in top plan, of the instrument illustrated in Fig. 1;

Fig. 5 is a view in perspective, with parts broken away, showing a modified coil supporting structure suitable for the instrument of Fig. 1;

Fig. 6 is a view in sectional elevation, of a modified instrument embodying the invention;

Fig. 7 is a schematic view, showing a modified arrangement of polyphase windings suitable for the instrument of Fig. 1;

Fig. 8 is a detail view in sectional elevation, with parts broken away, showing modified structure suitable for energizing the coil employed in the instrument of Fig. 1; and Fig. 9 is a view in sectional elevation, showing a transmitter and receiver assembly embodying the invention.

Referring to the drawing, Figure 1 shows an instrument having a coil movement 1 associated with a stator or magnetic structure 3. As previously explained, the instrument of Fig. 1 may be designed for measuring purposes or for controlling a circuit. However, for the purposes of initial discussion, it will be assumed that the instrument of Fig. 1 is employed as a measuring instrument.

The magnetic structure 3 includes a ring or annular member 5 within which a magnetic core member 7 is positioned. These members may be constructed of a suitable soft magnetic material, such as soft iron. Conveniently, one end of the annular member 5 may be closed by an integral wall 9 to form with the annular member a cup-shaped assembly. The core member 7 may be secured to the wall 9 in any suitable manner, as by means of a ring or spacer 11, which may be constructed of an insulating material such as a phenolic resin. The core member, spacer and wall 9 may be secured to each other by suitable machine screws (not shown).

By inspection of Fig. 1, it will be noted that the core member 7 and annular member 5 have opposed arcuate surfaces 7a and 5a which are spaced to define a ring-shaped air gap 13. Conveniently, the surfaces 5a and 7a may represent sections of concentric spheres having a common center A.

Polyphase windings are associated with the magnetic structure of Fig. 1 to establish a rotating magnetic field in the air gap 13. These windings may be either distributed or concentrated, and may have any desired number of phases. For the purpose of illustration, it will be assumed that, in Fig. 1, a two-phase rotating field is established by concentrated phase windings 15 and 17. These windings are positioned at right-angles to each other and are wound around the core member 7. If desired, the spacer 11 may be provided with recesses for permitting passage therethrough of the windings 15 and 17.

The winding 15 has two terminals 15a and 15b which extend through the wall 9 through suitable insulation. Similarly, the winding 17 is provided with terminals 17a and 17b. If a two-phase source is available, it may be connected directly to the terminals for the purpose of establishing the desired rotating field. However, if it is desired to energize the phase windings from a single-phase alternating current source, such as that represented by a generator 18, a phase splitter 19 may have its input connected to the generator. The phase splitter 19 is designed to provide a two-phase output, the phases being connected, respectively, to the windings 15 and 17.

Turning now to the coil movement 1, it will be observed that a circular conductor or coil 21 is disposed within the air gap 13 with its axis passing substantially through the point A. The coil 21 may be cemented or otherwise suitably secured to a skeleton or spider 23 having arms 23a which are substantially concentric with the air gap 13 about the point A. The spider is shown clearly in Fig. 3.

The coil 21 may be connected for energization in any suitable manner. In the specific embodiment of Figs. 1 and 3, the coil has two leads 21a and 21b which are connected, respectively, to the inner ends of spiral, flexible, conducting springs 25 and 27. These springs may be supported on an insulating bushing 29 which is secured to, or integral with, the spider 23. The entire spider, if desired, may be molded from a suitable insulating plastic such as a phenolic resin. The outer ends of the spiral springs are connected to conductive posts 31 and 33 which are insulated from, and extended through, the core member 7 and the wall 9. The posts are connected to a suitable energizing circuit in any desired manner, as through a switch 35.

The coil movement 1 is mounted for pivotal motion with respect to the magnetic structure. Preferably, the motion is a universal motion in all directions substantially about the point A. Although various pivot structures may be employed, preferably the structure takes the form of a resilient rod 37 constructed of any suitable resilient material, such as phosphor-bronze. The rod 37 has one end inserted in, and secured to, the core member 7. Also, the rod passes through the bushing 29 and is secured thereto. Consequently, the rod 37 supports the skeleton 23 and biases it toward the position illustrated in Fig. 1. In response to forces acting on the coil 21 relative to the magnetic structure 3, the coil 23 is free to tilt in any direction. The point of flexure may shift somewhat during operation of the instrument. A reasonable shift of the point of flexure can be tolerated. However, in order to minimize the shift, the point of flexure may be concentrated adjacent the point A in any suitable manner, as by reducing the diameter of the rod 37 adjacent the point A.

The rod 37 may project from the spider 23 to provide an indicator or pointer 39. This pointer cooperates with a polar scale 41 located on the surface of a transparent scale member 43 which is of spherical configuration. The scale member 43 may be constructed of glass or other suitable material and is secured to the magnetic structure 3 in any suitable manner, as by a ring 45.

It is believed that the operation of the instrument illustrated in Fig. 1 now may be set forth. It will be assumed that the windings 15 and 17 are energized in accordance with the voltage across the conductors L1, L2 of the single-phase circuit associated with the generator 18. The switch 35 is operated to connect the coil 21 to the secondary winding of a current transformer 51 which is associated with the conductor L2. It will be understood that a link 53 employed to short-circuit the secondary winding of the current transformer is removed after the switch 35 is operated. The current transformer is energized in accordance with current supplied to a load 54.

Referring now to Fig. 2, it will be assumed that, at some instant or reference time when the current going through the coil 21 has a maximum value and a direction represented by an arrow 55, the rotating magnetic field produced by the windings 15 and 17 has a direction represented by an arrow 57. Under the assumed conditions of energization, the left-hand portion of the coil 21, as viewed in Fig. 2, tends to move toward the observer; whereas, the right-hand portion tends to move away from the observer. The corresponding movement of the pointer 39 in Fig. 1 consequently is in a clockwise direction.

Ninety electrical degrees later, the rotating magnetic field has rotated 90° from the position illustrated by the arrow 57 in a clockwise or counterclockwise direction, depending on the connections of the windings 15 and 17 to the phase splitter. However, the current flowing through the coil 21 at such time has a zero value, and no forces are applied to the coil 21.

At 180° from the original reference time, the direction of the rotating magnetic field is reversed, and consequently is opposite to the direction represented by the arrow 57. However, at such time, the current in the current coil 21 also is reversed, and the forces applied to the coil are in the same directions as those initially applied thereto.

It can be shown that the magnitude of the tilt of the coil or of the pointer 39 is proportional to the product of the current in the current coil 21 and the field strength of the rotating magnetic field. With the assumed connections, this magnitude is proportional to the product of voltage and current of the circuit represented by the conductors L1 and L2. The direction of tilt of the coil 21 and the pointer 39 varies directly with the phase angle between the voltage and current of the circuit represented by the conductors L1 and L2.

As previously pointed out, the pointer 39 conveniently may have a polar scale 41 associated therewith. As shown in Fig. 4, the polar scale may include concentric circles 59 which are calibrated to indicate directly the volt amperes being measured by the instrument. In addition, the polar scale includes a plurality of lines 61 which correspond to portions of great circles of the spherical scale member 43 which pass through the center of the concentric circles 59 and which are displaced angularly about the axis of the pointer 39 when at rest, to indicate the phase angle between the voltage and current of the circuit represented by the conductors L1 and L2. One of the lines 61a is labeled "Zero degrees" and corresponds to the axis of real power. A second line 61b is labeled "90°" and corresponds to the axis of reactive power. Intermediate lines are labeled "Minus" and "Plus 45°."

Let it be assumed that the instrument has been energized to move the pointer 39 to the position 39a, as illustrated in Fig. 4. From an inspection of the polar scale associated with the pointer, it follows that the instrument is measuring twenty volt amperes, and that the phase angle between the voltage and current being measured is plus 45°. In addition, the distance of the tip of the pointer at 39a from the line 61a represents reactive power; whereas, the distance from the line 61b represents real power. Consequently, if desired, the scale may be calibrated to indicate real and reactive power.

If the coil 21 and the phase splitter 19 are both energized in accordance with the voltage of a circuit, the displacement of the pointer 39 is proportional to a function of the voltage, and the associated scale may be calibrated to indicate directly the magnitude of the voltage. Similarly, if the phase splitter 19 and the coil 21 are both energized in accordance with the current flowing in a circuit, the movement of the pointer 39 is in accordance with a function of the current, and the associated scale may be calibrated to indicate directly the magnitude of the current. In such cases, the direction of deflection of the pointer 39 is in a single plane. If one desires to measure voltage or current, the phase splitter and one of the windings 15 or 17 may be omitted, the remaining winding 17 or 15 being energized directly in accordance with the quantity being measured.

Let it be assumed next that the switch 35 is actuated to connect the coil 21 to the secondary winding of the voltage transformer 63 which is energized from a single-phase circuit independent of the circuit represented by the conductors L1 and L2. If the frequencies of the coil 21 and of the energization applied to the phase splitter 19 differ slightly, the pointer 39 is tilted and is rotated at an angular rate dependent on the difference between the two frequencies. The direction of rotation of the pointer 39 depends on which of the two frequencies is higher. Therefore, the instrument of Fig. 1 may be employed as a synchroscope.

Thus far, it has been assumed that the rod 37 has a circular cross section, and that it can be tilted readily in any direction. Let it be assumed next that the coil 21 is hinged to the associated magnetic structure in any suitable manner to permit tilting thereof only in one plane. For example, as shown in Fig. 5, the rod 37 may be replaced by a strip 37a of rectangular cross section. The strip 37a may be constructed of a resilient material, such as phosphor-bronze, and has a cross section such that it may be flexed readily in the direction of its thickness but may not be flexed in the direction of its width. When the strip 37a is employed, it permits measurement only of that component of applied forces which produces deflection of the coil 21 in a direction transverse to the plane of the strip 37a. The mounting of the strip 37a on the associated magnetic structure may be such as to permit adjustment of the direction of deflection of the coil 21.

For example, let it be assumed that the strip 37a is mounted on a core 7a which is similar to the core 7 of Fig. 1, except as hereinafter set forth. The strip 37a is secured to a cylindrical member 65 which is snugly positioned in an opening 67 in the core 7a. The cylindrical member 65 has a flange 69 projecting therefrom. A screw 71 is in threaded engagement with the core 7a and has a head projecting over the flange 69 to retain the strip 37a in any position of adjustment relative to the core. If the strip 37a is adjusted to permit deflection of the pointer 39 along the line 61a of Fig. 4, the instrument will measure real power. If the strip 37a is adjusted to permit deflection along the line 61b of Fig. 1, the pointer 39 then indicates reactive power. In this way, the strip 37a may be adjusted to indicate the component of power corresponding to any phase angle between the current and voltage of the circuit represented by the conductors L1 and L2.

A further modification of the instrument is illustrated in Fig. 6. In Fig. 6, a magnetic ring 5A and a magnetic core 7A correspond, respectively, to the ring 5 and core 7 of Fig. 1. These are spaced to provide an air gap 13A which corresponds to the air gap 13 of Fig. 1.

The magnetic core 7A is provided with an opening 75 through which passes a resilient rod 37A which corresponds to the rod 37 of Fig. 1. The rod 37A is secured to a plate 77 which closes the lower end of the opening 75.

A spider 23A corresponding to the spider 23 of Fig. 1 is secured to the upper end of the rod 37A and supports a circular coil 21A for movement in the air gap 13A. The rod 37A is hinged with respect to the plate 77. Conveniently, the hinging action is obtained by reason of the resilience of the rod, and preferably the hinging action is confined to an area or point A' adjacent the plate 77. Such confinement of the bending may be obtained by reducing the diameter of the rod 37A adjacent the point A'. The point A' constitutes the center of opposed spherical surfaces 5A' and 7A' which define the air gap 13A. Because the hinge point A' in Fig. 6 is lower than that A in Fig. 1, the shapes of the air gap 13A and of the spider 23A differ from the shapes of the corresponding elements of Fig. 1.

The ring 5A and the core 7A may be secured in any suitable manner to a ring 79 of insulating material, as by means of machine screws 81. Windings 15A and 17A correspond to the windings 15 and 17 of Fig. 1, and are employed in the same manner for the purpose of establishing a rotating magnetic field in the air gap 13A.

In order to indicate the deflection of the spider 23A, a mirror M is secured to the upper surface thereof. A source of light 83 is disposed to project a beam of light substantially along the axis of the rod 37A toward the mirror M. As the mirror is deflected, a reflected beam of light is directed against a scale member 43A which corresponds to the scale member 43. The scale member 43A may be made of a translucent material, such as frosted glass, and may have a polar scale thereon similar to that discussed with reference to Figs. 1 and 4. The reflected beam of light produces a spot visible from the exterior of the scale member 43A for the purpose of indicating the direction and magnitude of deflection of the spider 23A.

In order to damp movements of the spider 23A, various expedients may be adopted. For example, the opening 75 may be filled with petroleum or other liquids having a suitable viscosity for providing the desired damping.

If it is desired to control a circuit in accordance with a predetermined movement of the spider 23A, a photocell 87 may be positioned to intercept a reflected beam from the mirror M. A change in resistance of the photocell resulting from incidence of a beam of light thereon may be employed for controlling an electrical circuit in a manner well understood in the art. By positioning the photocell to intercept a reflected beam of light at a desired point, the associated circuit may be controlled in response to a predetermined magnitude and direction of deflection of the spider 23A relative to the associated magnetic structure, such as represented by the dotted position of the mirror M.

Referring again to Fig. 3, a modified structure for controlling a circuit is illustrated. In Fig. 3, a ring 89 surrounds the end of the pointer 39 which is constructed of electroconductive material. An electroconductive clip 91 is adjustably secured to the ring 89. The operating coil of a relay 93 and a source of current, such as a battery 95, are connected in series across the clip 91 and the pointer 39 by connections permitting free movement of the pointer 39. When the deflection of the spider 23 has a magnitude and a direction suitable for urging the pointer 39 against the clip 91, a circuit is completed for energizing the relay 93. Operation of the relay may be employed for effecting any desired circuit-controlling operation. If the ring 89 is constructed of insulating material, the direction of deflection of the spider 23 necessary to effect an engagement between the pointer 39 and the clip 91 may be varied as desired by adjusting the clip 91 angularly about the axis of the associated ring. The magnitude of deflection required may be adjusted by varying the diameter of the ring 89. If the ring 89 is constructed of electroconductive material, the relay 93 is independent of the direction of deflection of the spider 23.

As previously pointed out, the rotating field may be established by any suitable polyphase windings. For example, in Fig. 7, the magnetic core 17 has associated therewith three concentrated windings 97A, 97B and 97C. These coils are spaced angularly from each other about the axis of the core 17 by angles of 60° and are connected in star to a source of three-phase energy such as the output of a suitable phase splitter 19A. This phase splitter may be designed to provide a three-phase output when supplied with a single-phase input. The three-phase system of Fig. 7 may be employed in place of the two phase system of Fig. 1 for the purpose of establishing the desired rotating magnetic field.

It has been suggested that flexible electroconductive springs be employed for energizing the coil 21. If desired, the springs may be replaced by the modification illustrated in Fig. 8. In this modification, the leads 21a and 21b are connected to establish a closed circuit for the associated coil 21. One of the leads passes through a magnetic core 101 and constitutes the secondary winding of a current transformer having a primary winding 103 surrounding the magnetic core 101. The magnetic core 101 has clearance sufficient to permit movement of the associated secondary winding in response to deflection of the spider 23.

Referring again to Fig. 1, the operation of the instrument as a phase shifter will be discussed. Let it be assumed that the windings 15 and 17 are energized from the phase splitter 19 to produce a rotating field. If the coil 21 is manually tilted, a voltage is induced therein. The voltage induced in the coil 21 has a phase relative to the voltage of the generator 18 which depends upon the direction in which the coil 21 is tilted. The amplitude of the voltage induced in the coil 21 depends on the extent to which the coil 21 is tilted. It follows that the instrument of Fig. 1 can be employed as a phase shifter. Any desired load may be connected for energization from the coil 21. When so employed, the instrument not only controls phase angle of the output but amplitude of the output.

If a receiver is suitably connected to the instrument of Fig. 1, information can be transmitted from the instrument to the receiver over substantial distances. Such transmission is illustrated in Fig. 9 wherein a transmitter U1 is employed for transmitting information over substantial distances to a receiver U2.

The units U1 and U2 may be similar in construction to the unit of Fig. 1. The principal difference resides in the provision (in place of the pointer 39 of Fig. 1) of a rod 39B in the transmitter U1 which may be displaced manually or otherwise to tilt the associated coil 21. Although the units of Fig. 9 may employ the phase windings 15 and 17 of Fig. 1, it will be assumed for the purpose of discussion that the units of Fig. 9 are provided with the three-phase windings 97A, 97B and 97C of Fig. 7. The three-phase windings of the units U1 and U2 are connected in parallel for energization from a common source of three-phase alternating current.

Inasmuch as the voltage output of the coil 21 of the transmitter U1 depends on both the direction and the magnitude of the displacement of the rod 39B, and inasmuch as the pointer 39 of the receiver indicates on the scale member 43 the direction and magnitude of displacement of the rod 39B, it follows that any information may be transmitted from the transmitter to the receiver which can be translated into a direction of displacement of the rod 39B or a magnitude of displacement of the rod 39B, or both.

As a specific example, it will be assumed that wind velocity is to be transmitted from the transmitter to the receiver. To this end, a sphere S may be attached to the end of the rod 39B. This sphere conveniently may be constructed of a lightweight material such as aluminum.

If the sphere is exposed to wind, the sphere S is deflected relative to the polyphase windings in the direction of the wind. The magnitude of deflection of the sphere S depends on the speed of the wind.

The resulting deflection of the sphere S is transmitted through the rod 39B to the coil 21 of the transmitter. Consequently, the coil 21 of the transmitter 41 has a direction of tilt and a magnitude of tilt which depict the velocity of the wind. The output voltage of the coil 21 is transmitted to the coil 21 of the receiver U2. The pointer 39, therefore, is deflected in accordance with the direction and magnitude of the wind. The scale on the scale element 43 may be calibrated to indicate directly the desired direction and magnitude of the wind.

Although the invention has been described with reference to certain specific embodiments thereof, numerous modifications falling within the spirit and scope of the invention are possible.

I claim as my invention:

1. In an electroresponsive device, field-producing means effective, when energized, for establishing a rotating magnetic field, a conductor of electric current disposed in said field, means independent of the field-producing means for directing current through said conductor, and mounting means supporting the conductor for universal movement relative to the field-producing means.

2. In an electroresponsive device, field-producing means effective, when energized, for establishing a rotating magnetic field, a conductor of electric current disposed in said field, means independent of the field-producing means for directing current through said conductor, mounting means supporting the conductor for universal movement relative to the field-producing means, and means for portraying the direction and magnitude of the displacement of the conductor relative to the field-producing means.

3. In an electroresponsive device, field-producing means effective, when energized, for establishing a rotating magnetic field, a conductor of electric current disposed in said field, means independent of the field-producing means for directing current through said conductor, and mounting means supporting the conductor for universal movement relative to the field-producing means, the mounting means comprising a resilient member secured to the field-producing means and to the conductor.

4. In an electroresponsive device, field producing means effective, when energized, for establishing a rotating magnetic field, a conductor of electric current disposed in said field, means independent of the field-producing means for directing current through said conductor, and mounting means supporting the conductor for universal movement relative to the field-producing means, the conductor being of annular configuration concentric about an axis which passes substantially through the point about which the conductor is mounted for movement.

5. In an electroresponsive device, field-producing means effective, when energized, for establishing a rotating magnetic field, a conductor of electric current disposed in said field, means independent of the field-producing means for directing current through said conductor, mounting means supporting the conductor for universal movement relative to the field-producing means, a scale member having a polar scale thereon, and an indicating member for indicating scale values on the scale member, one of the members being mounted for movement relative to the remaining member in response to movement of the conductor relative to the field-producing means.

6. In an electroresponsive device, a magnetic structure having a ring-shaped air gap, windings associated with the magnetic structure for establishing, when energized, a magnetic field in the air gap rotating about the axis of the air gap, a circular electro-conductive coil disposed in the ring-shaped air gap, and pivot means mounting the circular coil for movement relative to the magnetic structure about a point lying substantially on said axis, said magnetic structure comprising an annular magnetic member and a magnetic core member disposed within the annular magnetic member, said members having adjacent surfaces of revolution substantially concentric about said common axis and spaced to define said air gap, said windings being polyphase windings.

7. In an electroresponsive device, a magnetic structure having a ring-shaped air gap, windings associated with the magnetic structure for establishing, when energized, a magnetic field in the air gap rotating about the axis of the air gap, a circular electro-conductive coil disposed in the ring-shaped air gap, said circular coil being yieldably biased toward a predetermined position, and pivot means mounting the circular coil for movement relative to the magnetic structure about a point lying substantially on said axis, said magnetic structure comprising an annular magnetic member and a magnetic core member disposed within the annular magnetic member, said members having adjacent surfaces of revolution substantially concentric about said common axis and spaced to define said air gap, said windings being polyphase windings.

8. In an electroresponsive device, a magnetic structure having a ring-shaped air gap, windings associated with the magnetic structure for establishing, when energized, a magnetic field in the air gap rotating about the axis of the air gap, a circular electro-conductive coil disposed in the ring-shaped air gap, pivot means mounting the circular coil for movement relative to the magnetic structure about a point lying substantially on said axis, said magnetic structure comprising an annular magnetic member and a magnetic core member disposed within the annular magnetic member, said members having adjacent surfaces of revolution substantially concentric about said common axis and spaced to define said air gap, said windings being polyphase windings, a scale element having a polar scale thereon, and an indicator element, one of the elements being secured to the magnetic structure and the remaining element being secured to the circular coil for movement therewith to indicate a predetermined quantity on the scale element.

9. In an electroresponsive device, a magnetic structure having a ring-shaped air gap, windings associated with the magnetic structure for establishing, when energized, a magnetic field in the air gap rotating about the axis of the air gap, a circular electro-conductive coil disposed in the ring-shaped air gap, and pivot means mounting the circular coil for movement relative to the magnetic structure about a point lying substantially on said axis, said magnetic structure comprising an annular magnetic member and a magnetic core member disposed within the annular magnetic member, said members having adjacent surfaces of revolution substantially concentric about said common axis and spaced to define said air gap, said windings being polyphase windings, the pivot means comprising an elongated resilient member having its ends secured respectively relative to the magnetic structure and to the circular coil.

10. In an electroresponsive device, a magnetic structure having a ring-shaped air gap, windings associated with the magnetic structure for establishing, when energized, a magnetic field in the air gap rotating about the axis of the air gap, a circular electro-conductive coil disposed in the ring-shaped air gap, pivot means mounting the circular coil for movement relative to the magnetic structure about a point lying substantially on said axis, said magnetic structure comprising an annular magnetic member and a magnetic core member disposed within the annular magnetic member, said members having adjacent surfaces of revolution substantially concentric about said common axis and spaced to define said air gap, said windings being polyphase windings, the pivot means mounting the circular coil for universal movement relative to the magnetic structure, and energizing means for directing current through the coil, said energizing means having terminals which are movable relative to the coil to permit the universal movement of the coil.

11. In an electroresponsive device for measuring a variable electrical quantity, a magnetic structure having a ring-shaped air gap, windings associated with the magnetic structure for establishing, when energized, a magnetic field in the air gap rotating about the axis of the air gap, a circular electro-conductive coil disposed in the ring-shaped air gap, pivot means mounting the circular coil for movement relative to the magnetic structure about a point lying substantially on said axis, said magnetic structure comprising an annular magnetic member and a magnetic core member disposed within the annular magnetic member, said members having adjacent surfaces of revolution substantially concentric about said common axis and spaced to define said air gap, said windings being polyphase windings, the pivot means mounting the circular coil for universal movement relative to the magnetic structure, energizing means for directing current through the coil, said energizing means having terminals which are movable relative to the coil to permit the universal movement of the coil, an indicator secured for movement with the coil, a scale member having a polar scale thereon secured to the magnetic structure, said indicator cooperating with the scale to indicate volt amperes, and a phase splitter connected to said polyphase windings, whereby the polyphase windings may be energized from a single-phase source.

12. In an electroresponsive device, a magnetic structure having a ring-shaped air gap, windings associated with the magnetic structure for establishing, when energized, a magnetic field in the air gap rotating about the axis of the air gap, a circular electro-conductive coil disposed in the ring-shaped air gap, pivot means mounting the circular coil for movement relative to the magnetic structure about a point lying substantially on said axis, said magnetic structure comprising an annular magnetic member and a magnetic core members disposed within the annular magnetic member, said members having adjacent surfaces of revolution substantially concentric about said common axis and spaced to define said air gap, said windings being polyphase windings, the pivot means mounting the circular coil for universal movement relative to the magnetic structure, energizing means for directing current through the coil, said energizing means having terminals which are movable relative to the coil to permit the universal movement of the coil, control means responsive to the position of the coil relative to the magnetic structure for controlling the conductivity of an electrical circuit.

13. In a transmitting device; a transmitter unit; a receiver unit; each of said units comprising field means effective when energized from a source of polyphase alternating current for establishing a rotating magnetic field, a coil disposed in the associated magnetic field and means mounting the coil for universal movement relative to the associated field means; circuit connections connecting the field means of the two units for energization from a common source of polyphase alternating current, and circuit connections connecting the coils of the two units in series.

14. In a transmitting device; a transmitter unit; a receiver unit; each of said units comprising field means effective when energized from a source of polyphase alternating current for establishing a rotating magnetic field, a coil disposed in the associated magnetic field and means mounting the coil for universal movement relative to the associated field means; circuit connections connecting the field means of the two units for energization from a common source of polyphase alternating current, and circuit connections connecting the coils of the two units in series, said transmitter unit including means for deflecting the coil of the transmitter unit relative to the field means in a direction and with an amplitude dependent on a variable quantity to be measured, and said receiver including means for portraying the direction and amplitude of movement of the coil of the receiver unit relative to the associated field means.

HENRY L. BERNARDE.

REFERENCES CITED

The following references are of record in the file of this patent:

UNITED STATES PATENTS

| Number | Name | Date |
| --- | --- | --- |
| 1,874,899 | Chireix | Aug. 30, 1932 |
| 2,312,336 | Holliday | Mar. 2, 1943 |
| 2,442,764 | Ferrill | June 8, 1948 |
| 2,466,703 | Harrison | Apr. 12, 1949 |

FOREIGN PATENTS

| Number | Country | Date |
| --- | --- | --- |
| 103,657 | Sweden | Feb. 3, 1942 |
| 289,008 | Germany | July 18, 1914 |